United States Patent

[11] 3,575,489

| [72] | Inventor | John R. Novak |
| | | Canoga Park, Calif. |
| [21] | Appl. No. | 719,422 |
| [22] | Filed | Apr. 8, 1968 |
| [45] | Patented | Apr. 20, 1971 |
| [73] | Assignee | TRW Inc. |
| | | Redondo Beach, Calif. |

[54] LIQUID CELL OPTICAL SHUTTER
1 Claim, 4 Drawing Figs.

| [52] | U.S. Cl. | 350/160 |
| [51] | Int. Cl. | G02f 1/12 |
| [50] | Field of Search | 350/160, 161; 252/300 |

[56] References Cited
UNITED STATES PATENTS

| 3,214,382 | 10/1965 | Windsor | 350/160(P) |
| 3,214,383 | 10/1965 | Moore et al. | 350/160(P) |
| 3,453,038 | 7/1969 | Kissa et al. | 350/160 |

Primary Examiner—William L. Sikes
Attorneys—Daniel T. Anderson, Edwin A. Oser and James V. Tura ABSTRACT: An optical shutter consisting of an aromatic hydrocarbon in liquid form together with a solvent and an electrolyte disposed in a cell having a pair of electrodes. The aromatic hydrocarbon may, for example, be a polynuclear hydrocarbon and exhibits an electrochromic effect. Thus when an electric field is applied to the cell the hydrocarbon becomes ionized and absorbs light within the visible region while the neutral compound is transparent.

PATENTED APR 20 1971 3,575,489
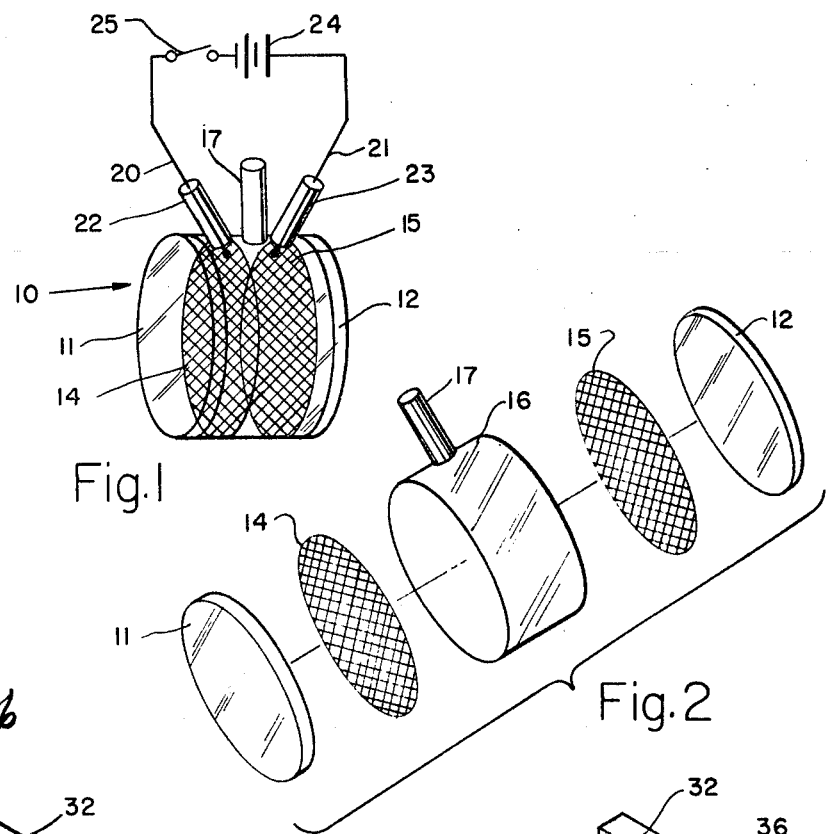
Fig.1
Fig.2
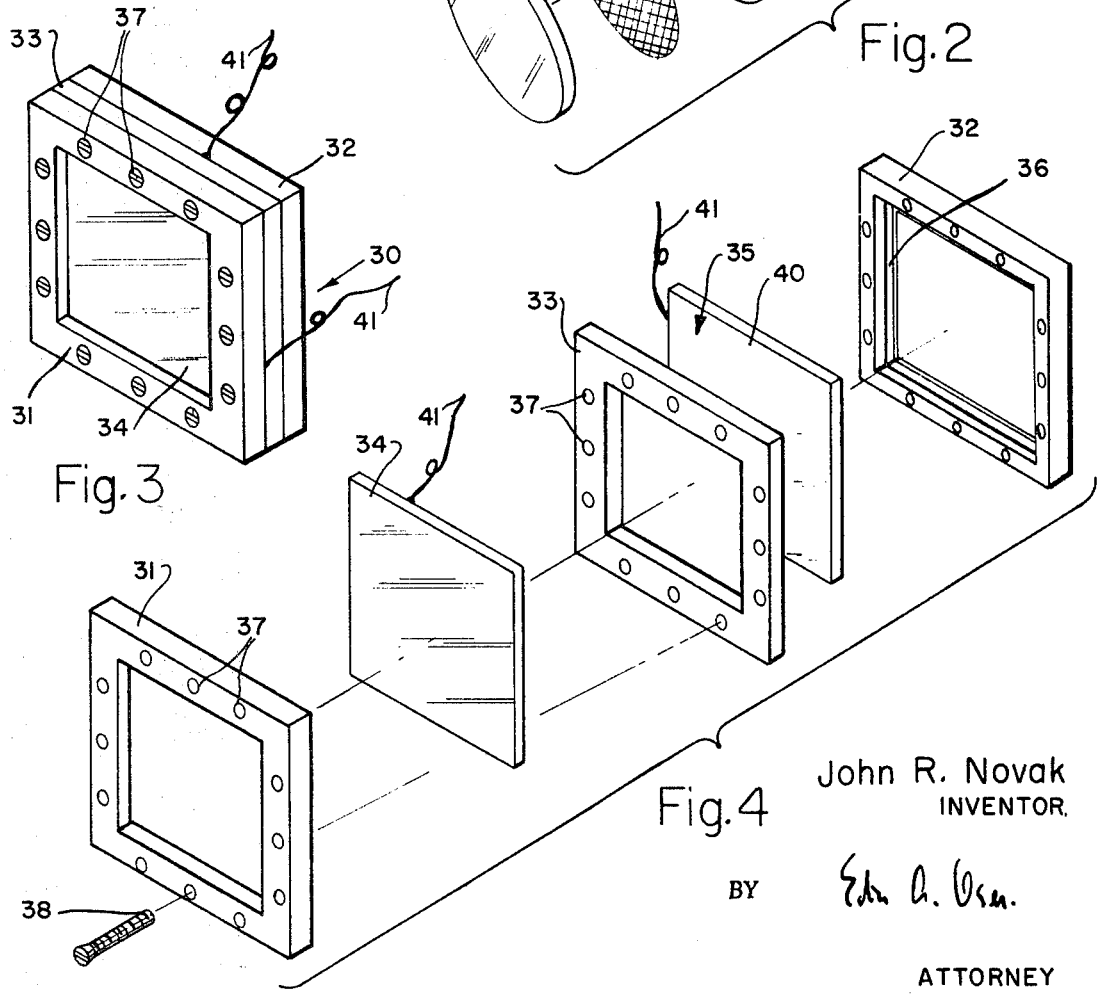
Fig.3
Fig.4
John R. Novak
INVENTOR,
BY
ATTORNEY

LIQUID CELL OPTICAL SHUTTER

BACKGROUND OF THE INVENTION

This invention relates generally to electrochromic processes, and particularly relates to an optical shutter essentially including a liquid exhibiting electrochromic properties.

It has been known for some time that chemiluminescence may be obtained by exciting certain aromatic hydrocarbons by means of an electric field in the liquid state. Such work has been reported, for example, by David M. Hercules in SCIENCE, Vol. 145, page 808, Aug. 21, 1964. Accordingly when an electric field is applied to a suitable aromatic hydrocarbon, the liquid emits light, that is, it exhibits chemiluminescence.

The present invention is based on the fact that certain chemical compounds such as aromatic hydrocarbons are perfectly transparent to visible light in their neutral state but absorb light within the visible region in their ionized form. Accordingly it will be seen that a solution of such a compound in the presence of a suitable electrolyte may be ionized by the application of an electric current or an electric field so as to ionize the compound. This phenomenon may appropriately be called an electrochromic effect, that is, the differential absorption of visible light is controlled by the application of an electric field.

Thus what has been found is that certain aromatic hydrocarbons, and in particular polynuclear hydrocarbons, are transparent to visible light while they strongly absorb in the visible spectral region when they become ionized.

It is accordingly an object of the present invention to provide an optical shutter which may be energized by an electric field.

Another object of the invention is to provide a liquid cell optical shutter which may be rapidly energized, say, on the order of 10 milliseconds.

Still another object of the invention is to provide an optical shutter energizable by a low voltage and low current excitation, the optical shutter containing a liquid as the active ingredient.

SUMMARY OF THE INVENTION

An optical shutter in accordance with the present invention comprises a transparent cell for holding the active liquid. Furthermore, two electrodes are disposed in the cell. These electrodes are so made that they permit a substantial portion of the light to pass. Thus they may be made, for example, of wire mesh, or else a conventional glass window may be coated with a transparent conductive material.

The cell contains an aromatic hydrocarbon compound which is normally transparent but absorbs in its ionized state light within the visible range. In other words, the hydrocarbon compound exhibits electrochromism as defined hereinabove. Finally there may be provided a solvent for the hydrocarbon compound. This solvent, of course, should not decompose the compound. Additionally the solvent should also function as an electrolyte or else an electrolyte may be added. When an electric voltage is applied to the electrodes a field is created within the cell which then ionizes the compound to render it absorbent.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

BRIEF DESCRIPTION OF THE DRAWING

FIG. 1 is a view in perspective of a cell for forming an optical shutter in accordance with the present invention, the cell having a pair of wire mesh electrodes;

FIG. 2 is an exploded view of the cell of FIG. 1;

FIG. 3 is a view in perspective of another cell which may be used for the shutter of the invention, the cell having a pair of transparent electrodes; and FIG. 4 is an exploded view of the cell of FIG. 3.

DESCRIPTION OF THE PREFERRED EMBODIMENTS

Referring now to the drawing, and particularly to FIGS. 1 and 2, there is illustrated a liquid cell generally indicated at 10 which may serve as an optical shutter in accordance with the present invention. As shown in the exploded view of FIG. 2, the cell consists of two transparent windows 11 and 12. These may, for example, consist of a suitable glass such as Pyrex and should be transparent within the desired wavelength region. If it is desired that the cell be transparent to ultraviolet light, the windows 11 and 12 may be made of quartz.

A pair of electrodes 14 and 15 is disposed adjacent to the two windows 11 and 12. They may, for example, be spaced 1 millimeter apart. The electrodes may, for example, consist of wire mesh as shown and may be made of platinum or some other metal which will not corrode or be attacked by the fluids contained in the cell 10. The interstices of the wire mesh electrodes 14 and 15 should be large enough to permit light to pass therethrough. A cylindrical body portion 16 is provided which is connected to the two windows 11 and 12 in a manner to provide a fluidtight seal such as a glass-to-glass seal. The cylinder 16 has attached thereto a tube 17 through which the cell may be filled with the desired compounds.

As shown in FIG. 1, the two electrodes 14 and 15 are provided with wire leads 20 and 21 which extend through the cylinder 16, for example, by glass seals 22 and 23, so that the cell 10 may be sealed. A battery 24 may be connected between the leads 20 and 21 through a switch 25 so that an electric voltage may be applied to the cell at will. It should be understood that a reversing switch may also be provided so that the voltage across the electrodes 14 and 15 may be reversed at will.

The cell 10 may be used in accordance with the present invention to make use of the electrochromic process as defined hereinabove. To this end the cell 10 may be filled with an aromatic hydrocarbon and preferably with a polynuclear hydrocarbon, such, for example, as naphthalene, anthracene or coronene. Suitable compounds for purposes of the present invention will be more fully discussed hereinafter and their structural formulas will be given.

However, by way of example, the cell may be filled with coronene having the following structural formula:

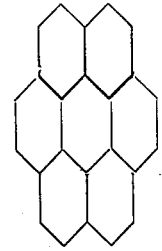

This may, for example, be a solution of $10^{-3}$ molar coronene in a suitable solvent. The solvent may, for example, be dimethylformamide, having the formula $HCOH(CH_3)_2$, or acetonitrile, also called methylcyanide, the latter having the formula $CH_3CN$. Since the reaction is rather sensitive to the presence of oxygen which acts as an inhibitor, it is important that the solvent be degassed or deoxygenated. The solvent itself may serve as an electrolyte. However, preferably a specific electrolyte is added, such as tetraethylammonium bromide, having the formula $(C_2H_5)_4NBr$, or tetraethylammonium perchlorate $(C_2H_5)_4NClO_4$. These may be used in a concentration of 0.1 to 0.01 molar.

Coronene together with other polynuclear aromatic hydrocarbons shares the property of being substantially transparent to light within the visible region. On the other hand, when these compounds, of which coronene is an example, are ionized, they exhibit a new or different absorption spectrum. In other words, the neutral compound coronene only absorbs light in the ultraviolet region. The mononegative molecule or ion with an electron removed absorbs across the entire visible region, while the dinegative molecule which is the ion with two electrons missing absorbs still stronger than the mononegative molecule across the visible region.

Theoretical arguments show that symmetrical molecules, such, for example, as benzene, coronene, triphenylene, have absorption spectra which are essentially the same for the negative ion, the dinegative ion and the positive ion. These absorption spectra resemble those of the triplet-triplet absorption. The name "triplet" has a historical significance because it was found that certain normally single spectral lines split up into three adjacent lines when the radiating atom or molecule is subjected to a magnetic field. This is known as the Zeeman effect. Modern quantum physics can readily explain this phenomenon, which is due to the electron spin. A triplet energy state may be characterized by the fact that the two outer electrons have spins which are not compensated, that is, the two electron spins are parallel. Accordingly the electron spins tend to precess when subjected to a magnetic field. These precessions have to be quantized, and the result is that a single energy level is split up into three, which explains the presence of three spectral lines caused by the transition of an electron from one triplet state to another.

Accordingly all that has to be done is to close the switch 25 which causes ionization of the coronene in the cell 10. This will now absorb light.

The shutter will operate within, say, 0.01 of a second or 10 milliseconds. Once the electric field is removed the shutter becomes transparent again within the order of a few seconds, such as 3 seconds. This process may be speeded up by reversing the electric field for a short period. However, this may not be required.

Instead of utilizing cell 10 such as shown in FIGS. 1 and 2 with a pair of wire mesh or wire gauze electrodes 14, 15, it is also feasible to utilize a cell with so-called transparent electrodes. Such a cell, generally designated at 30, has been illustrated in FIGS. 3 and 4. As shown particularly in FIG. 4, the cell 30 includes two metal frames 31 and 32. These may, for example, consist of aluminum or other conductive, chemically inert material. They are sealed to each other and spaced from each other by an insulating spacer 33 which may, for example, consist of a polytetrafluoroethylene resin sold in the trade under the name "Teflon." Such a material is electrically insulating and will not be attacked by organic compounds. The spacer 33 is made like a rectangular frame with an opening to permit light to pass therethrough.

There are further provided two transparent electrodes 34 and 35 of generally rectangular form as shown. These may be secured between and electrically connected to the respective frames 31 and 32 by the spacer 33. Each of the metal frames 31 and 32 is provided with an innner recess 36 for receiving the transparent electrodes 34 and 35. Furthermore, the frames 31, 32 and the spacer 33 may be provided with a plurality of apertures 37 for securing together the cell 30 by means of screws 38, which may, for example, be made of nylon or some other suitable insulating material. Each of the electrodes may, for example, consist of a glass pane which has been made electrically conductive by a thin, transparent layer 40 of a conductive material or compound, such, for example, as tin oxide, aluminum, platinum or chromium. Electrically conductive wires such as 41 may be connected to each of the conductive layers 40 so that they may be connected to a suitable battery. Such transparent electrodes are well known and are sold in the trade.

Accordingly, a battery may be connected between the two wires 41 to apply a voltage to the two electrodes 34 and 35. Otherwise the cell 30 of FIGS. 3 and 4 operates in the same manner as does that of FIGS. 1 and 2.

The electrodes such as 14, 15 of FIGS. 1 and 2 or 34, 35 of FIGS. 3 and 4 may be energized with a voltage between 1 and 4 volts. Assuming that the electrodes have a size of, say, 5×7 inches, a current on the order of 10 milliamperes will flow. However, there is no reason why the effective size of the cell may not be increased to, say, 3×4 feet. This will simply require the application of a larger power to the cell.

Instead of utilizing coronene, it is also feasible to utilize one of the following compounds:

Naphthalene 

Anthracene 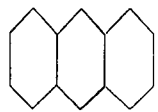

Pyrene 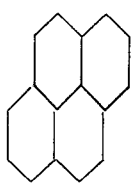

1,2; 5,6 dibenzanthracene 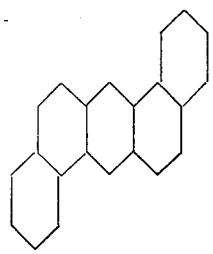

Phenanthrene 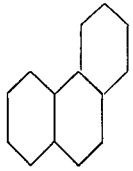

1,2 benzanthracene 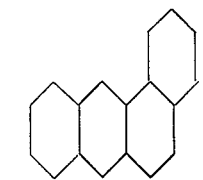

1,2,3,4 dibenzanthracene 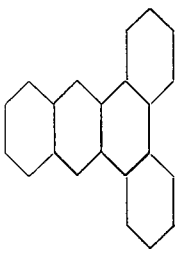

1,2; 7,8 dibenzanthracene 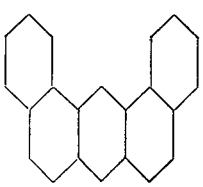

Perylene

Tetracene 3,4 benzpyrene

Triphenylene

Biphenyl p-Terphenyl p-Quarterphenyl

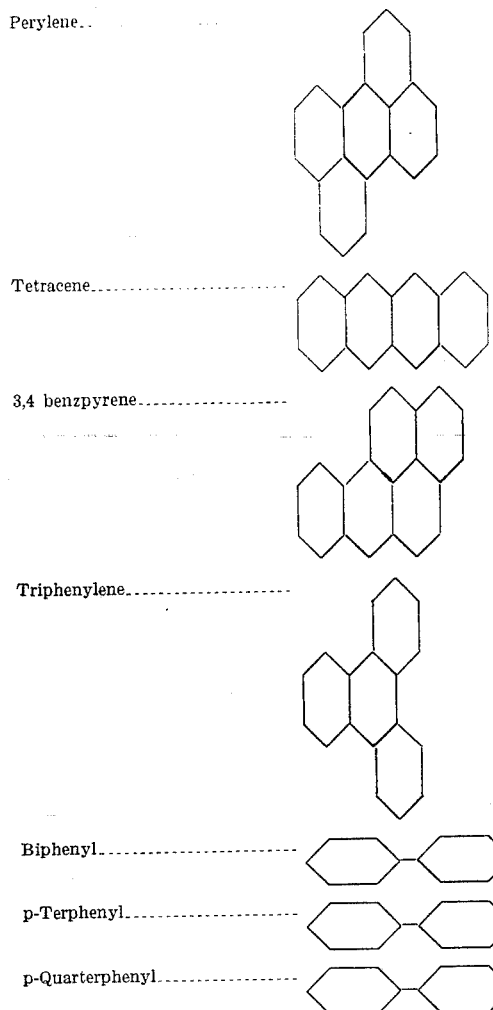

In the above structural formulas it will be apparent that the hydrogen atoms connected to each free corner of the benzene rings have been omitted.

For the following compounds the ion spectra are not known. However, at the present time the triplet-triplet spectra are known. Since it is noted that ion and triplet-triplet spectra are similar, these compounds are also suitable for use with electrochromic absorption devices.

Naphthocoronene

Naphthochrysene

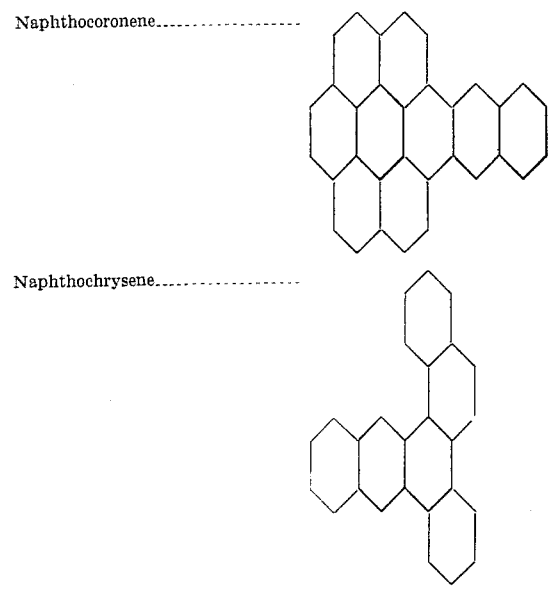

2,3 benzopicene

Peropyrene 1,2; 7,8 dibenzocoronene

Anthraceno-anthracene

Pentacene

Tribenzo-perylene

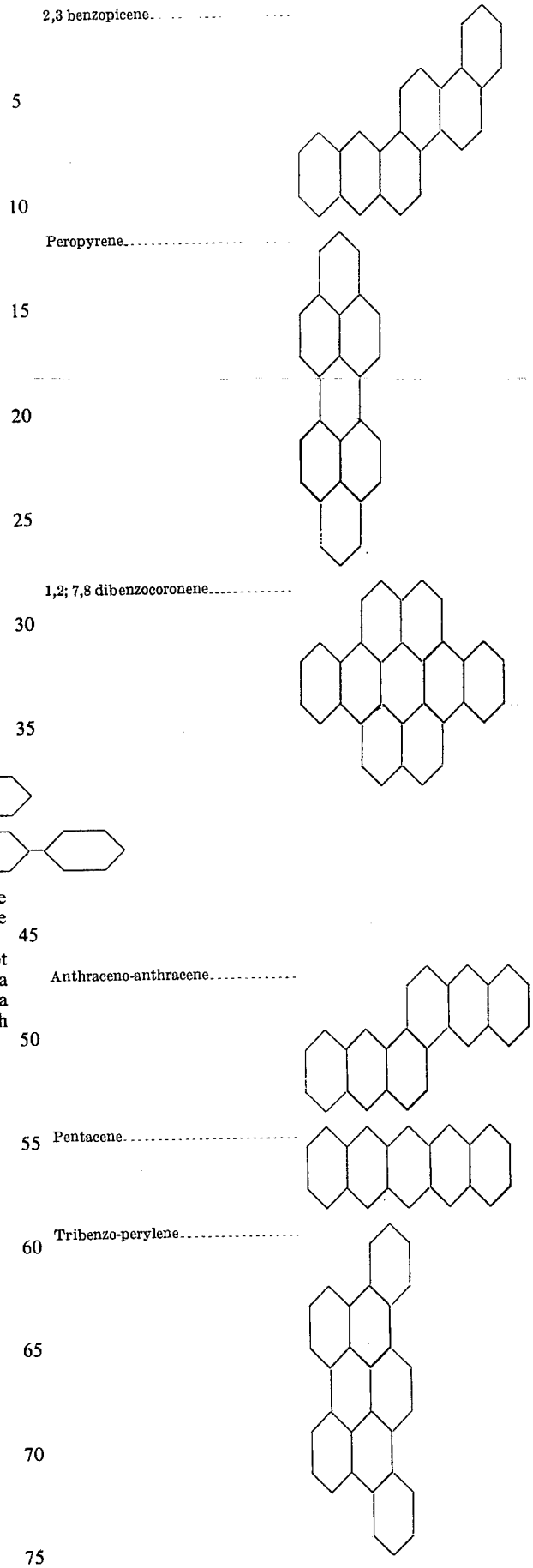

1,12 benz-perylene.

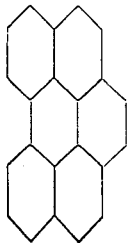

Picene.

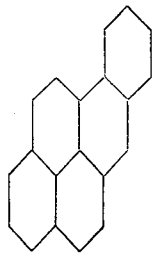

Chrysene.

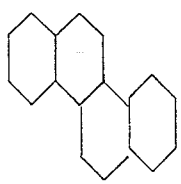

There has thus been disclosed an optical shutter which makes use of the electrochromic effect. The shutter consists of a cell containing as an active ingredient an aromatic hydrocarbon such as a polynuclear hydrocarbon having a spectrum which when ionized absorbs visible light while the neutral compound is transparent. The shutter may be energized in a period on the order of 10 milliseconds. The energization is readily reversible. The hydrocarbon may be ionized by the application of a few volts to the electrodes of the cell.

I claim:

1. An optical shutter comprising:
   a. a cell having transparent windows;
   b. a pair of electrodes disposed in said cell adjacent said windows, said electrodes being arranged to transmit a substantial portion of light in the visible range;
   c. a solution of 1/1000 molar coronene in said cell,
   d. said coronene being dissolved in deoxygenated dimethylformamide in said cell; and
   e. further between 1/10 and 1/100 molar tetraethylammonium bromide in said cell for providing an electrolyte, whereby said coronene may be ionized upon the application of an electric voltage across said electrodes to absorb visible light in the ionized state.